United States Patent
Brice

(10) Patent No.: US 9,915,957 B2
(45) Date of Patent: Mar. 13, 2018

(54) VENT COVER FOR GAS PRESSURE REGULATOR

(71) Applicant: Martin S. Brice, Charlotte, NC (US)

(72) Inventor: Martin S. Brice, Charlotte, NC (US)

( * ) Notice: Subject to any disclaimer, the term of this patent is extended or adjusted under 35 U.S.C. 154(b) by 0 days.

(21) Appl. No.: 15/201,912

(22) Filed: Jul. 5, 2016

(65) Prior Publication Data

US 2018/0011499 A1    Jan. 11, 2018

(51) Int. Cl.
| | |
|---|---|
| *F16K 31/12* | (2006.01) |
| *G05D 16/06* | (2006.01) |
| *F16K 1/12* | (2006.01) |
| *B01D 39/06* | (2006.01) |
| *B01D 46/00* | (2006.01) |
| *B01D 39/08* | (2006.01) |
| *B01D 39/16* | (2006.01) |

(52) U.S. Cl.
CPC ......... *G05D 16/0655* (2013.01); *B01D 39/06* (2013.01); *B01D 39/083* (2013.01); *B01D 39/16* (2013.01); *B01D 46/008* (2013.01); *B01D 46/0012* (2013.01); *F16K 1/126* (2013.01); *B01D 2239/0208* (2013.01); *B01D 2239/0618* (2013.01); *B01D 2279/35* (2013.01)

(58) Field of Classification Search
CPC ........... Y10T 137/794; Y10T 137/8122; Y10T 137/7825; Y10T 137/7793; G05D 16/0655; F16K 1/126; B01D 39/06; B01D 39/083; B01D 39/169; B01D 46/0012; B01D 46/008; B01D 2239/0208; B01D 2239/0618; B01D 2279/35
See application file for complete search history.

(56) References Cited

U.S. PATENT DOCUMENTS

| | | | | |
|---|---|---|---|---|
| 3,153,424 | A * | 10/1964 | Acker ............... | G05D 16/0663 137/484.8 |
| 3,633,603 | A * | 1/1972 | Furlong ................. | F15C 1/006 137/805 |
| 3,890,122 | A * | 6/1975 | Frantz ................... | B01D 45/16 137/204 |
| 3,906,982 | A * | 9/1975 | Fleischhacker .... | G05D 16/0666 137/116.5 |
| 4,987,937 | A * | 1/1991 | Nowicke ................ | B60C 23/00 137/550 |
| 9,128,492 | B2 * | 9/2015 | Olbrisch ................ | G05D 16/10 |
| 2002/0108654 | A1* | 8/2002 | Vreeland ............... | B01D 46/10 137/550 |
| 2002/0108655 | A1* | 8/2002 | Vreeland ............... | B01D 46/10 137/550 |
| 2010/0276614 | A1* | 11/2010 | Patterson ........... | G05D 16/0602 251/12 |
| 2013/0000756 | A1* | 1/2013 | Griffin, Jr. ........... | G05D 16/185 137/528 |

(Continued)

*Primary Examiner* — Jessica Cahill
(74) *Attorney, Agent, or Firm* — Clements Bernard Walker, PLLC; Seth L. Hudson

(57) ABSTRACT

Disclosed is a gas pressure regulator for gas or liquid that has inlet, an outlet and a diaphragm positioned between said inlet and said outlet in an manner that one side of the diaphragm controls the flow of fluid through the inlet to the outlet, a vent exposed to the opposite side of said diaphragm, and a spring in association with the opposite side of the diaphragm to adjust the position of the diaphragm, and a gas porous filter positioned in an manner that is adjacent the vent.

11 Claims, 1 Drawing Sheet

(56) References Cited

U.S. PATENT DOCUMENTS

2015/0346737 A1* 12/2015 Olbrisch ............... G05D 16/10
                                                    137/505
2016/0208941 A1*  7/2016 Amadini ................ F16K 17/12

* cited by examiner

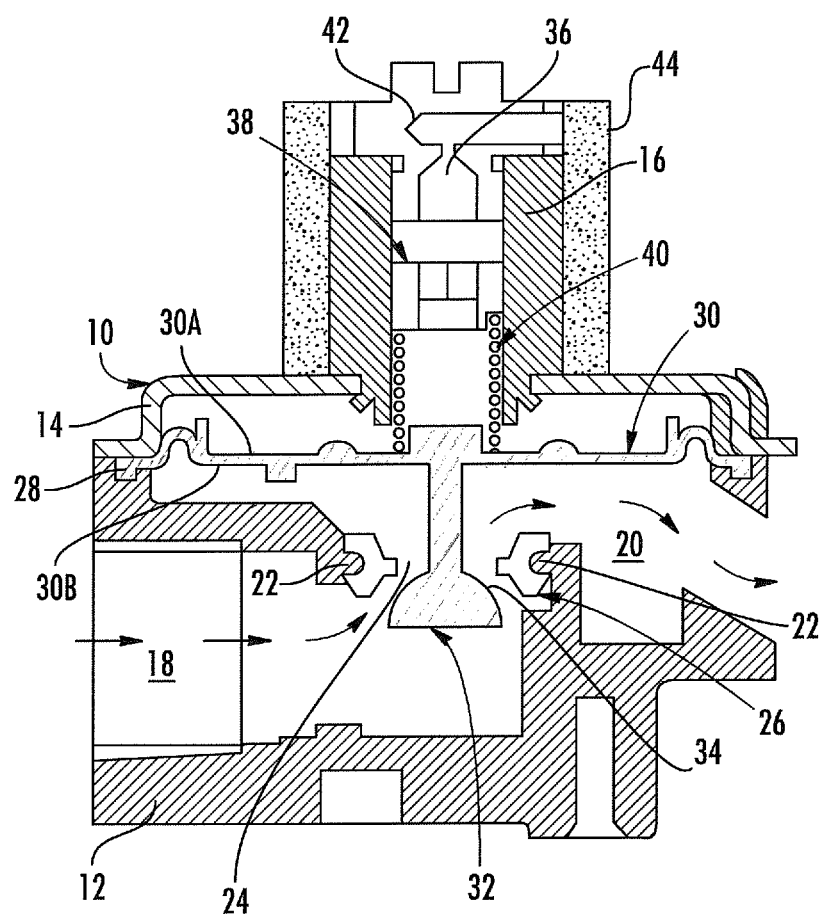

VENT COVER FOR GAS PRESSURE REGULATOR

FIELD OF THE INVENTION

The invention concerns a vent cover for a gas pressure regulator. Some environments that require a gas pressure regulator are extremely dirty. When the vent on the gas pressure regulator becomes clogged from dust or from wash down, for example, the gas pressure regulator can become slow in reaction time and/or may operate incorrectly. The solution is to provide a gas porous filter having certain characteristics that keep the dust and washing solutions from blocking the vent. The filter can be produced from any porous material such as foam, interlocking metallic shaving, steel wool, or porous cloth.

BACKGROUND

The invention concerns a vent cover for a gas pressure regulator. Some environments that require a gas pressure regulator are extremely dirty. A typical example is in an animal confinement building housing chicken, pig, cow, or other livestock, where, due to the noxious gases and dusty environment, significant ventilation is required to provide adequate breathing air. The ventilation fans cause the lightweight dust from the litter on the floor of the confinement building to become substantially airborne. A typical confinement building for chickens may have more than 4 inches deep of litter on the entire floor of the building where the materials can be very fine particles from wood shavings or rice husks or other absorbent materials. During the period between occupancy in the confinement building it may be necessary to wash down the inside of the building and the equipment in the building to sanitize the environment. Also during the period where the building is not occupied the ventilation fans are not in use and it is common that the atmosphere can become very humid and this leads to condensation on surfaces inside the building. Typical confinement building temperatures when the occupancy period begins have to be maintained such that the animals are in comfortable conditions to promote healthy growth in the case of chickens this temperature is 90 degrees Fahrenheit. Under these harsh conditions it is common that the combination of fine dust, moisture followed by elevated temperatures will form dense concentrations of fine dust. Typically gas pressure regulators are equipped with a very small vent hole which can measure as little as a few thousands of an inch. If the vent hole of the gas pressure regulator becomes clogged with this dense matter it is practically impossible to clean the vent hole and therefore the gas regulator will not operate as intended.

Gas pressure regulators are well known and are particularly useful for controlling the flow of fluids, such as liquid petroleum gas (propane) or natural gas (methane), as they flow into a burner for heating purposes. Gas pressure regulators, such as used to regulate and reduce the gas pressure of natural gas or liquid petroleum gas, received from a relatively high pressure supply must be vented. The venting occurs on the side of the pressure regulating diaphragm not exposed to the gas, and the venting is necessary to allow the diaphragm to move freely without causing a vacuum or pressure condition within the vented cavity as well as allowing an escape for gas that would be released from the relief valve in case an over pressure condition was obtained at the outlet of the regulator. These may be found in gas (methane or propane, for example) or oil furnaces for residential, commercial buildings or process heaters. In the past, such gas pressure regulators were mounted in such a way that accumulation of dust or corrosive substances did not affect the operation of the regulators. Specifically they were positioned in housings, or otherwise mounted in such a way that falling dust would not accumulate on the gas pressure regulator, such as positioning the regulator under a solid surface. Also it is important that periodic wash down not affect the operation of the gas regulator. On the other hand it is important that the regulator be exposed to the variance in air pressure to assure that no matter what the air pressure is, the gas pressure regulator can supply the burner with a constant and steady supply of gas or oil, for example. When a very tight housing surrounds the gas regulator, the regulator cannot be adequately ventilated to the atmosphere and thus will not work satisfactorily. This is not a solution for many very dirty environments.

U.S. Pat. No. 3,985,157 to Ferguson discloses an adjustable regulator vent cover that is exposed to adverse weather conditions such as icing. The vent cover for regulators having an internally threaded vented neck, in combination, a hollow body having inner and outer walls interconnected by a side wall, a first neck-receiving opening defined in said inner wall, a second neck-engaging opening defined in said outer wall coaxial with said first opening of a diameter slightly less than the diameter of the associated regulator neck, a vent opening defined in said side wall, and a cap having a threaded stem receivable within said second opening and a lip concentric to said stem of a diameter greater than the diameter of said second opening adapted to engage said outer wall adjacent said second opening. A gas pervious screen is mounted in the side wall to prevent insects from entering the interior of the gas regulator.

SUMMARY OF THE INVENTION

The solution to the present invention is to provide a gas porous filter having certain characteristics that keep the fine dust from blocking the vent. The filter can be produced from foam, interlocking metallic shaving, steel wool, porous cloth, a fibrous non-woven product made from natural or synthetic fibers, or any other porous material. The filter can be removed for cleaning or replacement with a new filter in the event that it becomes clogged with dust that has been deposited on the filter through the process of ventilating the confinement building.

In the broadest sense the invention is the combination of a gas pressure regulator having an inlet, an outlet and a diaphragm positioned between said inlet and said outlet in an manner that one side of the diaphragm controls the flow of fluid from the inlet to the outlet, a vent exposed to the opposite side of said diaphragm, and a spring in association with the opposite side of the diaphragm to adjust the position of the diaphragm, and a gas porous filter positioned in an manner that is adjacent the vent.

BRIEF DESCRIPTION OF THE DRAWING

FIG. 1 is a view of a pressure regulator according to an embodiment.

DESCRIPTION OF THE INVENTION

With regard to FIG. 1, a gas pressure regulator 10 possesses a body sufficient to withstand the forces normally found in a gas regulator, preferably of metal or plastic or a combination of both. The gas pressure regulator 10 comprises a first body portion 12, a second body portion 14 attached to said first body portion 12, and a third body portion 16 attached to said second body portion. Preferably the first, second and third body portions are secured to one another by means of screws, rivets, etc. not shown. The first body portion 12 has an inlet opening 18 and an outlet opening 20. The first body portion 12 also contains a narrow neck portion 22 between the inlet 18 and the outlet 20, having an elastomeric or rubber seat 26 that further reduces the cross-sectional opening 24 of the narrow neck portion 22. The first body portion 12 also contains a groove 28 at the top of the regulator as it is positioned in FIG. 1, although the gas regulator can be positioned in any direction, including upside down from the position shown in FIG. 1. Positioned in groove 28 is a diaphragm 30 typically made from rubber or a thermoplastic elastomer such that it easily flexes due to a change in pressure as little as 0.10 inches water column to 25 psi and above. Secured to the diaphragm 30 is a valve stem 32 generally positioned in the middle of the diaphragm 30. The valve stem 32 is sized to project into the narrow neck portion 22 and centrally arranged within the seat 26. The valve stem 32 has a spherical surface 34 at one end thereof, that when conditions are such, the spherical surface forms a seal with the seat 26 to prevent gas or liquid from flowing to the outlet 20. Contrarily, when conditions are such, the valve stem 32 will be positioned well away from the seat 26 to allow gas or liquid to easily flow from the inlet 18 to the outlet 20. Lastly the valve stem 32 may be at any position in between these extremes and therefore it produces a variable flow between the inlet and the outlet in response to any varying pressure in the pressure from the inlet supply.

To seal the diaphragm from dirt etc, the second body portion 14 is secured to the first body portion 12 such that it is in contact with the diaphragm 30 on the side 30A opposite the side 30B facing the narrow neck 22. The second body portion 14 also is shaped to be in contact with the first body portion 12 as shown in FIG. 1.

The third body portion 16, as shown in FIG. 1 is a separate part of the gas pressure regulator. However, it can be formed as a single monolithic structure with the second body portion 14. The third body portion 16 has a central vent opening 36 that extends from the atmosphere to the side 30A of diaphragm 30. Positioned with the central vent opening 36 is an adjustment screw 38 and a spring 40 in contact with the adjustment screw 38 on one end and side 30A of the diaphragm 30 on the other end. This allows the gas pressure regulator to be adjusted to permit a change in pressure as little as 0.10 inches water column and greater, such as up to 25 psi and above, depending on the pressure of the gas or liquid in inlet 18. The adjustment screw 38 can be advanced toward or away from the diaphragm 30 as is desired, thus place more force on the spring 40 or removing force from the spring, respectively. Lastly a vent cap 42 may be positioned over the third body portion 16 to permit the vent opening 36 to be directed toward one side or the other, as desired.

To keep the vent opening 36 from clogging up with dirt and debris, such as that in an animal confinement building, a gas porous filter 44 is positioned in contact with the vent opening. The filter can be made from foam rubber, foam elastomeric material, steel wool, elastomeric porous material, a fibrous non-woven product made from natural or synthetic fibers, woven or knitted fabric, interlocking metal shavings, and generally any porous material that is capable of screening out dirt and debris and allowing the vent opening to breath.

In operation, the gas pressure regulator 10 may be adjusted at the factory to give the outlet pressure to an orifice (sometimes referred to as the set point) as required by the customer, or may be adjustable and set by the customer. The outlet pressure in opening 20 and the narrow neck opening 22 are selected by the customer to give the desired flow rate of liquid petroleum gas (propane) or natural gas (methane) necessary for the application. For example the inlet pressure in inlet 18 may be 7 inches water column for natural gas or 14 inches for liquid petroleum gas. When the inlet pressure increase in inlet 18, the outlet pressure in 20 starts to increase, but the increasing force created on the diaphragm 30 causes the stem 32 to move toward and closer to seat 26, thereby throttling the flow through the narrow neck 22 and reducing the pressure on the diaphragm 30. As this pressure decreases in inlet 18, the stem 32 moves away from the seat 26 allowing more flow and higher outlet pressure at 20. The outlet pressure at 20 modulates with respect to the set point.

Thus it is apparent that there has been provided, in accordance with the invention, a novel gas pressure regulator that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly it is intended to embrace all such alternatives, modifications and variations as fall within the spirit and broad scope of the appended claims.

What is claimed is:

1. The combination of a gas pressure regulator having a first body portion, a second body portion, and a third body portion, said first body portion has an inlet and an outlet, a diaphragm is positioned between said first body portion and said second body portion in an manner that one side of the diaphragm contacts and controls the flow of fluid through the inlet to the outlet and a valve stem is secured to the diaphragm, a vent is exposed to the opposite side of said diaphragm, and a spring is in association with the opposite side of the diaphragm to adjust the position of the diaphragm, and a gas porous filter is positioned in an manner that is adjacent the vent; the gas porous filter surrounds the third body portion and the vent; the spring is located between the diaphragm and an adjustment screw; the vent is located on an opposite side of the adjustment screw that contacts the spring.

2. The combination of claim 1, wherein said gas porous filter is made of any porous material foam rubber, foam elastomeric material, steel wool, elastomeric porous material, a fibrous non-woven product made from natural or synthetic fibers, or interlocking metal shavings, capable of screening out dirt and debris and allowing the vent to breath.

3. The combination of claim 2 wherein the gas porous filter is removable for cleaning or replacement.

4. The combination of claim 1, wherein said gas pressure regulator operates between 0.10 inches water column to 25 psi.

5. The combination of claim 1 wherein the vent of the regulator is protected from blockage caused by airborne fine particles.

6. The combination of a gas pressure regulator having a first body portion, a second body portion, and a third body portion, said first body portion has an inlet and an outlet, a diaphragm is positioned between said first body portion and said second body portion in an manner that one side of the diaphragm contacts and controls the flow of fluid through the inlet to the outlet and a valve stem is secured to the diaphragm, said first body portion contains a groove and said diaphragm is positioned within said groove, a vent is exposed to the opposite side of said diaphragm, and a spring is in association with the opposite side of the diaphragm to adjust the position of the diaphragm, and a gas porous filter is positioned in an manner that is adjacent the vent, the first body portion contains a neck portion between the inlet and the outlet, the neck portion includes an elastomeric seat that reduces a cross-sectional opening of the neck portion and valve stem projects into the neck portion; the gas porous filter surrounds the third body portion and the vent; the spring is located between the diaphragm and an adjustment screw; the vent is located on an opposite side of the adjustment screw that contacts the spring.

7. The combination of claim 6, wherein the valve stem has a spherical surface.

8. The combination of claim 6, wherein said gas porous filter is made of any porous material foam rubber, foam elastomeric material, steel wool, elastomeric porous material, a fibrous non-woven product made from natural or synthetic fibers, or interlocking metal shavings, capable of screening out dirt and debris and allowing the vent to breath.

9. The combination of claim 8 wherein the gas porous filter is removable for cleaning or replacement.

10. The combination of claim 6, wherein said gas pressure regulator operates between 0.10 inches water column to 25 psi.

11. The combination of claim 6 wherein the vent of the regulator is protected from blockage caused by airborne fine particles.

* * * * *